(12) United States Patent
Zhao et al.

(10) Patent No.: US 9,661,622 B2
(45) Date of Patent: May 23, 2017

(54) METHOD AND DEVICE FOR E-PDCCH TRANSMISSION AND BLIND DETECTION

(71) Applicant: CHINA ACADEMY OF TELECOMMUNICATIONS TECHNOLOGY, Beijing (CN)

(72) Inventors: Rui Zhao, Beijing (CN); Xueming Pan, Beijing (CN); Rakesh Tamrakar, Beijing (CN); Ranran Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 142 days.

(21) Appl. No.: 14/396,637

(22) PCT Filed: Apr. 19, 2013

(86) PCT No.: PCT/CN2013/074417
§ 371 (c)(1),
(2) Date: Oct. 23, 2014

(87) PCT Pub. No.: WO2013/159676
PCT Pub. Date: Oct. 31, 2013

(65) Prior Publication Data
US 2015/0092695 A1    Apr. 2, 2015

(30) Foreign Application Priority Data
Apr. 23, 2012 (CN) .......................... 2012 1 0120735

(51) Int. Cl.
*H04W 4/00* (2009.01)
*H04W 72/04* (2009.01)
(Continued)

(52) U.S. Cl.
CPC ......... *H04W 72/042* (2013.01); *H04L 5/0053* (2013.01); *H04L 5/0058* (2013.01);
(Continued)

(58) Field of Classification Search
CPC ........................... H04W 72/04; H04W 72/042
(Continued)

(56) References Cited

U.S. PATENT DOCUMENTS

2010/0120424 A1* 5/2010 Johansson ............. H04L 5/0053
455/435.1
2010/0195583 A1* 8/2010 Nory ..................... H04L 1/1854
370/329
(Continued)

FOREIGN PATENT DOCUMENTS

CN    102202324 A    9/2011
CN    102202400 A    9/2011
(Continued)

OTHER PUBLICATIONS

International Search Report and Written Opinion for PCT/CN2013/074417 mailed Jul. 25, 2013.
(Continued)

*Primary Examiner* — Farah Faroul
(74) *Attorney, Agent, or Firm* — Kilpatrick Townsend & Stockton LLP

(57) ABSTRACT

The present invention relates to the field of communications, and provides a method and a device for enhanced-physical downlink control channel (E-PDCCH) transmission and blind detection. The method is: a network side carrying out corresponding E-PDCCH transmission resource configuration for allocation of each sub-frame; and a terminal respectively adopting different modes to perform E-PDCCH blind detection in each frame, so that better link adaptation of the E-PDCCH transmission can be implemented. Therefore, the
(Continued)

balance of E-PDCCH transmission in the sub-frames is ensured, the effect of E-PDCCH blind detection of the terminal is further improved, and the E-PDCCH demodulation performance is further promoted.

16 Claims, 8 Drawing Sheets

(51) Int. Cl.
　　*H04W 24/00*　　(2009.01)
　　*H04L 5/00*　　(2006.01)
　　*H04L 1/00*　　(2006.01)

(52) U.S. Cl.
　　CPC ........... *H04W 24/00* (2013.01); *H04L 1/0038* (2013.01); *H04L 5/0051* (2013.01)

(58) Field of Classification Search
　　USPC ........................................................ 370/329
　　See application file for complete search history.

(56) References Cited

U.S. PATENT DOCUMENTS

| | | | | | |
|---|---|---|---|---|---|
| 2011/0038303 | A1* | 2/2011 | Ji | ........... | H04L 5/0053 370/315 |
| 2012/0082130 | A1* | 4/2012 | Xue | ........... | H04L 5/001 370/330 |
| 2013/0003663 | A1* | 1/2013 | Blankenship | ........ | H04L 5/0053 370/329 |
| 2013/0039284 | A1* | 2/2013 | Marinier | ........ | H04L 5/001 370/329 |
| 2013/0044706 | A1* | 2/2013 | Suzuki | ........ | H04W 72/042 370/329 |
| 2013/0114521 | A1* | 5/2013 | Frenne | ........ | H04L 5/0053 370/329 |
| 2013/0176995 | A1* | 7/2013 | Park | ........ | H04W 72/06 370/336 |
| 2013/0195275 | A1* | 8/2013 | Koivisto | ........ | H04L 1/0061 380/287 |
| 2013/0250782 | A1* | 9/2013 | Nimbalker | ........ | H04L 1/0038 370/252 |
| 2015/0043457 | A1* | 2/2015 | Liu | ........ | H04B 7/024 370/329 |

FOREIGN PATENT DOCUMENTS

| | | |
|---|---|---|
| CN | 102665230 A | 9/2012 |
| WO | 2009133444 A1 | 11/2009 |
| WO | 20130136951 A1 | 9/2013 |

OTHER PUBLICATIONS

InterDigital Communications, LLC, On ePDCCH Multiplexing, 3GPP TSG RAN WG1 Meeting #68bis, R1-121319, Jeju, Korea, Mar. 26-30, 2012.
Renesas Mobile Europe Ltd., On ePDCCH search spaces, 3GPP TSG-RAN WG1 Meeting #68bis, R1-121398, Jeju, Korea, Mar. 26-30, 2012.
LG Electronics, Multiplexing of Different DCI Messages, 3GPP TSG RAN WG1 Meeting #68bis, R1-121456, Jeju, Korea Mar. 26-30, 2012.
Qualcomm Incorporated, Multiplexing different DCI messages for e-POCCH, 3GPP TSG RAN WG1 #68bis, R1-121572, Mar. 26-30, 2012, Jeju, Korea.
CATT, CATR, CMCC, Huawei, HiSilicon, LGE, Potevio, WF on ePDCCH building block, 3GPP TSG RAN WG1 #68bis, R1-121862, Jeju, Korea, Mar. 26-30, 2012.
The Office Action issued on Dec. 22, 2015 in the JP counterpart application (2015-507351).
R1-120893 ; 3GPPTSG RAN WGl Meeting #68; Dresden, Germany; Feb. 6-10, 2012; Agenda item: 7.6.4; Source: LG Electronics; Title: Concept of E-PDCCH CCE (revision of R1-120454); Document for: Discussion and decision.
R1-121399; 3GPP TSG-RAN WG1 Meeting #68bis; Jeju, Korea, Mar. 26-30, 2012; Agenda item: 7.6.3; Source: Renesas Mobile Europe Ltd.; Title: Resource mapping for ePDCCH; Document for: Discussion and Decision.
R1-121570; 3GPP TSG RAN WG1 #68bis; Mar. 26-30, 2012; Jeju, Korea; Agenda item: 7.6.1; Source: Qualcomm Incorporated; Title: Reference signals for ePDCCH; Document for: Discussion and Decision.

* cited by examiner

--Prior Art--

--Prior Art--

--Prior Art--

--Prior Art--

--Prior Art--

--Prior Art--

A) E-REGs divided based on frequency domain

B) E-REGs divided based on time domain and frequency domain

A) Schematic diagram of first system configuration  
B) Schematic diagram of second system configuration ■ Legacy PDCCH REs  ▓ CRS REs  ▨ DMRS REs  ⦀ CSI-RS REs  ▦ Muting CSI-RS REs

METHOD AND DEVICE FOR E-PDCCH TRANSMISSION AND BLIND DETECTION

This application is a US National Stage of International Application No. PCT/CN2013/074417, filed on 19 Apr. 2013, designating the United States, and claiming the benefit of Chinese Patent Application No. 201210120735.9, filed with the Chinese Patent Office on Apr. 23, 2012 and entitled "Method and device for E-PDCCH transmission and blind detection", which is hereby incorporated by reference in its entirety.

FIELD OF THE INVENTION

The present invention relates to the field of communications and particularly to a method and a device for E-PDCCH transmission and blind detection.

BACKGROUND OF THE INVENTION

In a Long Term Evolution (LTE) Rel-8/9/10 system, Physical Downlink Control Channels (PDCCHs) are transmitted in each radio sub-frame, and referring to FIG. 1, PDCCHs are typically transmitted in first N Orthogonal Frequency Division Multiplexing (OFDM) symbols of a sub-frame, where possible values of N are 1, 2, 3 and 4, and N=4 is allowable to occur only in a system with the system bandwidth of 1.4 MHz. The first N OFDM symbols herein are referred to as a "legacy PDCCH region", and also referred to as a control region.

The control region for transmitting PDCCHs in the LTE Re1-8/9/10 system is logically divided into Control Channel Elements (CCEs), where a CCE is composed of nine Resource Element Groups (REGs), and the REGs belonging to a CCE are mapped throughout the whole bandwidth range by using the method based on interleaving of the REGs. An REG is composed of four Resource Elements (REs) duplicated in the time domain and adjacent in the frequency domain, where REs for transmitting common reference symbols are not included in the REs of which the REG is composed, and a particular definition of an REG is as illustrated in FIG. 2. Reference can be made to the description in the standard 36.211 for the particular definition of the REG and the mapping of the CCE to the REGs.

Downlink Control Information (DCI) is also transmitted in CCEs, and DCI for a User Equipment (UE) can be transmitted in M logically consecutive CCEs, where possible values of M in the LTE system are 1, 2, 4 and 8, each of which is referred to as an aggregation level of CCEs. The UE performs PDCCH blind detection in the control region to search for DCI transmitted for the UE, where the blind detection refers to that a decoding attempt is made for different DCI formats and aggregation levels of CCEs by using a Radio Network Temporary Identity (RNTI) of the UE, and if the decoding operation is correct, then DCI for the UE is received. The LTE UE needs to perform the blind detection on the control region in each downlink sub-frame in a non-Discontinuous Reception (non-DRX) state to search for DCI.

PDCCHs for a relay system, referred to as R-PDCCHs, are defined in the LTE-10 system, and the R-PDCCHs occupy the region for Physical Downlink Shared Channels (PDSCHs). FIG. 3 illustrates a particular structural diagram of R-PDCCH and PDSCH resources, where the R-PDCCH is used by a base station to transmit control signaling to a relay, and the legacy PDCCH region defined in the LTE Rel-8/9/10 system, is also referred to as a control region.

Resources occupied by the R-PDCCHs are configured in high-layer signaling, where Physical Resource Block (PRB) pairs occupied by the R-PDCCHs can be consecutive or inconsecutive.

A PRB is a resource unit composed of a slot in the time domain and a Resource Block (RB) in the frequency domain, where a slot includes seven consecutive OFDM symbols with a normal Cyclic Prefix (CP) or six consecutive OFDM symbols with an extended CP. Taking the normal CP as an example, an RB is composed of twelve sub-carriers consecutive in the frequency domain. Correspondingly a PRB pair is a resource unit composed of two slots in a sub-frame in the time domain and an RB in the frequency domain. As per the relevant definition of the search space of R-PDCCHs, there is no public search space of R-PDCCHs but a relay-specific R-PDCCH search space. Downlink (DL) grant signaling and Uplink (UL) grant signaling are transmitted through the Time Division Multiplexing (TDM) mode, where:

The DL grant is transmitted in a first slot in which the relay detects the DCI format 1A and a DCI format related to the downlink transmission mode; and The UL grant is transmitted in a second slot in which the relay detects the DCI format 0 and a DCI format related to the uplink transmission mode.

Also two transmission modes are defined for transmission of R-PDCCHs respectively as an interleaving mode and a non-interleaving mode, where:

In the interleaving mode, the definition of PDCCHs, the aggregation levels and the CCE as the unit in the LTE Rel-8/9/10 system are also applied, where each CCE is composed of nine REGs, and a CCE is mapped to REGs also through interleaving as defined for PDCCHs; and In the non-interleaving mode, the unit of the aggregation levels is a PRB, and there is a specific mapping relationship between resources occupied by candidate channels in the search space and the order of PRBs.

Referring to FIG. 4, FIG. 4 illustrates configuration diagrams of Channel State Information-Reference Signals (CSI-RS's) in the LTE Rel-10 system, where the numbered RE locations are the resource locations at which transmission of a CSI-RS may be configured in the system, and transmission modes of CSI-RS's include a 2-port multiplex mode, a 4-port multiplex mode and an 8-port multiplex mode. Each terminal is configured separately with the number of ports and resource locations of CSI-RS's, which may result in such a situation that different terminals occupy different resource locations. Moreover each terminal can further be configured with a Zero Power CSI-RS (i.e., CSI-RS at zero power), where the configuration is performed in accordance with the 4-port multiplex mode, and no signal is transmitted at a resource location corresponding to the Zero Power CSI-RS, for example, if a 4-port CSI-RS pattern is configured to be the Zero Power CSI-RS, then it indicates that the terminal considers that no Physical Downlink Shared Channel (PDSCH) data is transmitted at this RE location. As can be seen from FIG. 4, in a PRB pair, the size of resources capable of bearing the PDSCH transmission may vary dependent upon different configurations of the CSI-RS or Zero Power CSI-RS.

In the discussion of the Enhanced-PDCCH (E-PDCCH) in the LTE Rel-11 system, it has been determined that there are two transmission modes for the E-PDCCH, i.e., frequency-domain consecutive (localized) and inconsecutive (distributed) transmission modes, which are applicable to different scenarios. Typically the localized transmission mode is generally applicable to such a scenario that the base station can obtain comparatively precise channel information fed back from the terminal and the interference from an adjacent cell will not vary sharply from one sub-frame to another, where according to Channel State Information (CSI) fed back from the terminal, the base station selects consecutive frequency resources with comparatively good quality to transmit E-PDCCHs for the terminal and performs the pre-coding/beam-forming process to improve the transmission performance. In the case that no channel information can be obtained accurately or the interference from an adjacent cell sharply varies from one sub-frame to another and is unpredictable, E-PDCCHs need to be transmitted in the distributed transmission mode, that is, they are transmitted over frequency resources inconsecutive in frequency to thereby obtain a frequency diversity gain. FIG. 5 and FIG. 6 illustrate examples of E-PDCCH transmission in the localized transmission mode and in the distributed transmission mode respectively, where the transmission of one DCI occupies four PRB pairs.

There are several possible definitions of the E-PDCCH resource as follows:

A. A PRB pair is divided into a specific number N of E-REGs/E-CCEs which may be the same or different in size.

B. A PRB pair is divided into an integer number of E-REGs/E-CCEs dependent upon the configuration of the system (e.g., the configuration of a legacy PDCCH region, a CRS, a DMRS, a CSI-RS/Zero Power CSI-RS, etc.), where the number of E-REGs/E-CCEs is determined based on the configuration of the system and may vary from one sub-frame to another.

C. RE resources available in a PRB pair are divided into an integer number of E-REGs, each of which includes the same number of REs, and an E-CCE is composed of a specific number of E-REGs.

With the assumption of the configuration described above, for the case that a PRB pair is divided into a specific number N of E-REGs/E-CCEs, E-PDCCHs at the same aggregation level may have varying demodulation performance from one sub-frame to another. For example, when a PRB pair includes four E-CCEs all the time, if reference signals of the system are transmitted in more REs in the sub-frame 1, then there will be less available REs in which PDCCHs are transmitted; and on the contrary, if reference signals of the system are transmitted in less REs in the sub-frame 2, then there will be more available REs in which E-PDCCHs can be transmitted. Therefore, if the two sub-frames described above are configured with the same specific number N of E-REGs for the E-PDCCH transmission, then there will be a sharp difference between the numbers of REs included in E-CCEs configured respectively in the two sub-frames. For example, if the number of available REs to transmit E-PDCCHs in the sub-frame 1 is 15, and the number of available REs to transmit E-PDCCHs in the sub-frame 2 is 20, then there are 15 REs per E-REG in the sub-frame 1 and 30 REs per E-REG in the sub-frame 2 given N=1, and apparently this E-PDCCH transmission mode may degrade greatly the performance of E-PDCCHs.

SUMMARY OF THE INVENTION

Embodiments of the invention provide a method and a device for E-PDCCH transmission and blind detection so as to improve the performance of E-PDCCHs.

Particular technical solutions according to the embodiments of the invention are as follows:

A method for E-PDCCH transmission includes:
determining time-frequency resources occupied for E-PDCCH transmission respectively in each sub-frame according to configuration information at a network side; and
transmitting E-PDCCHs to a terminal side over the corresponding time-frequency resources respectively in each sub-frame according to a result of determination.

A method for E-PDCCH blind detection includes:
determining time-frequency resources occupied for E-PDCCH blind detection respectively in each sub-frame according to network-side indication; and
performing the E-PDCCH blind detection over the corresponding time-frequency resources respectively in each sub-frame according to a result of determination.

A device for E-PDCCH transmission includes:
a processing unit configured to determine time-frequency resources occupied for E-PDCCH transmission respectively in each sub-frame according to configuration information at a network side; and
a communication it configured to transmit E-PDCCHs to a terminal side over the corresponding time-frequency resources respectively in each sub-frame according to a result of determination.

A device for E-PDCCH blind detection includes:
a control unit configured to determine time-frequency resources occupied for E-PDCCH blind detection respectively in each sub-frame according to network-side indication; and
a blind detection unit configured to perform the E-PDCCH blind detection over the corresponding time-frequency resources respectively in each sub-frame according to a result of determination.

The embodiments of the invention provide a method of configuring resources for E-PDCCH transmission according to the system configuration, where the network side performs corresponding E-PDCCH transmission resource configuration for each sub-frame, and the terminal respectively adopts different modes to perform E-PDCCH blind detection in each frame, so that better link adaptation of the E-PDCCH transmission can be implemented. Therefore, the balance of E-PDCCH transmission in sub-frames is ensured, the effect of E-PDCCH blind detection of the terminal is further improved, and the E-PDCCH demodulation performance is further promoted.

DETAILED DESCRIPTION OF THE EMBODIMENTS

In order to improve the performance of E-PDCCHs, in embodiments of the invention, the specific number K of E-REGs with non-overlapping resources are set in a PRB pair, and an E-CCE is composed of one or more E-REGs; and a terminal detects an E-PDCCH by determining the number of E-REGs included in a resource granularity (e.g., an E-CCE) at a single aggregation level used for E-PDCCH detection and/or determining the lowest aggregation level and a set of aggregation levels for E-PDCCH blind detection, and the number of candidate E-PDCCHs at each aggregation level, according to higher-layer signaling indication and/or under a predefined principle based upon preset configuration information notified of by the network side.

Preferred embodiments of the invention will be described below in details with reference to the drawings.

Figure 1:
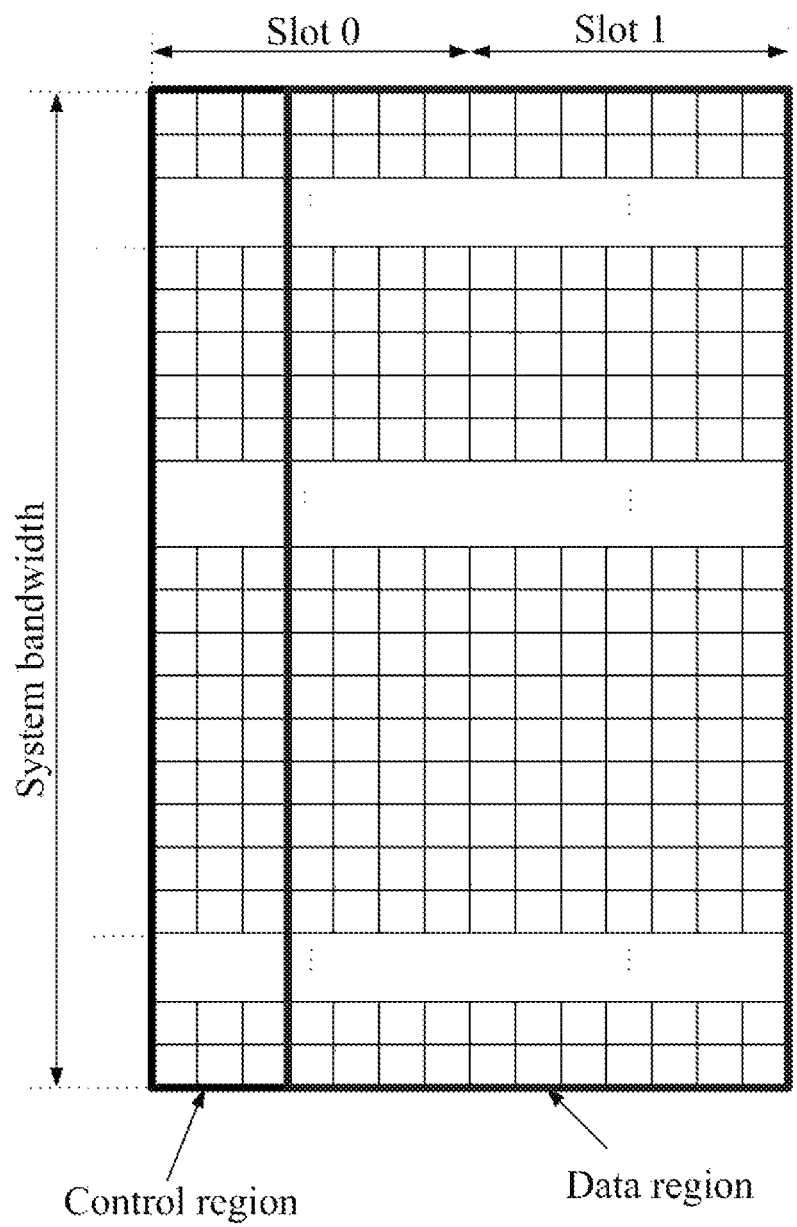
FIG. 1 is a schematic diagram of a multiplex relationship between a control region and a data region in a downlink sub-frame in the prior art.
Figure 2:
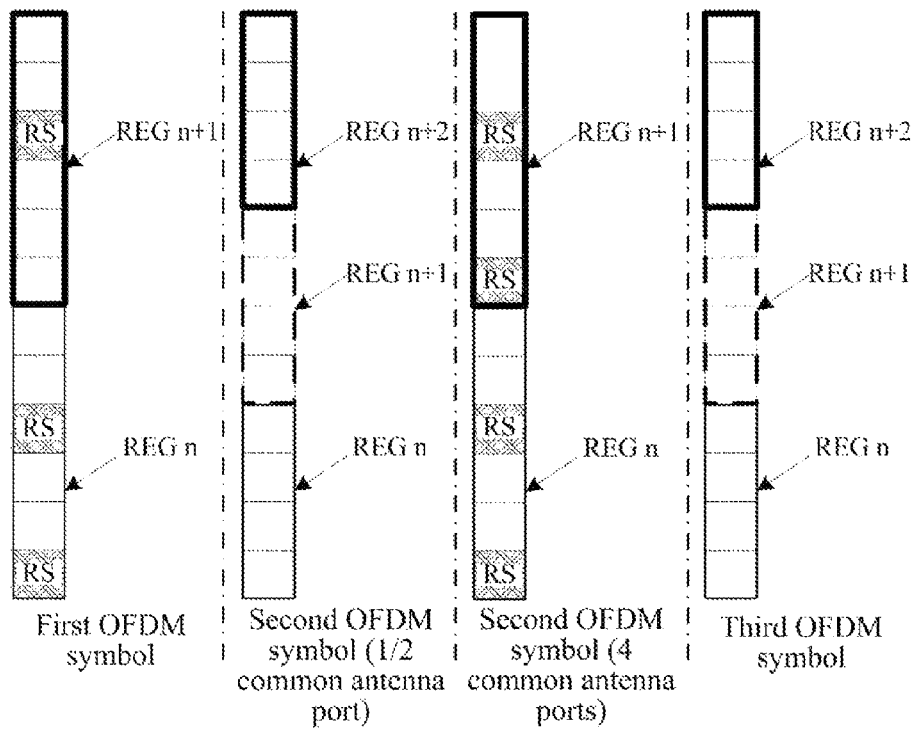
FIG. 2 is a schematic diagram of an REG in the prior art.
Figure 3:
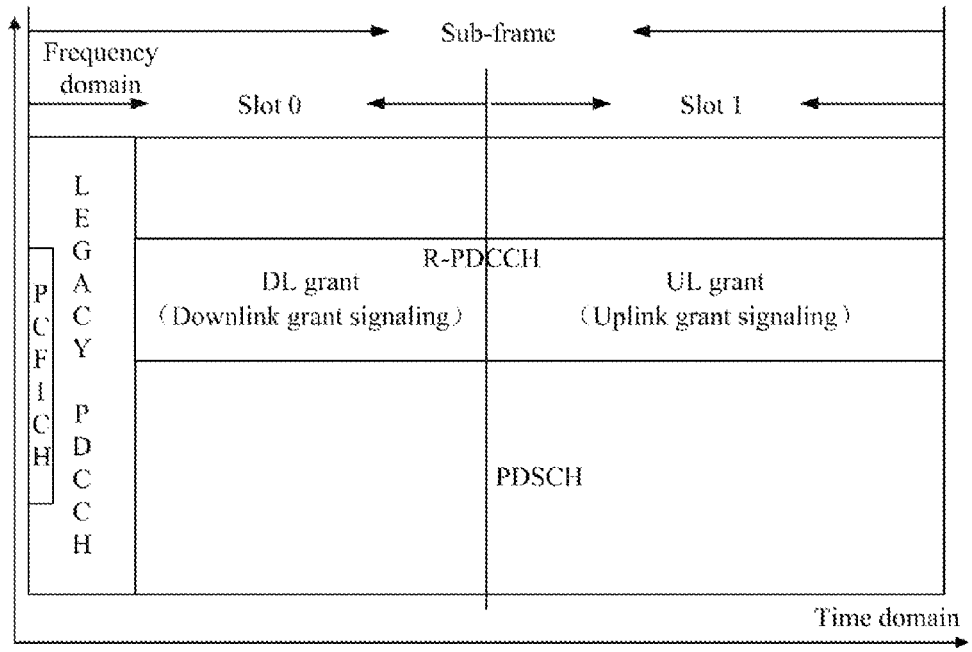
FIG. 3 is a schematic diagram of R-PDCCH and PDSCH resources in the prior art.
Figure 4:
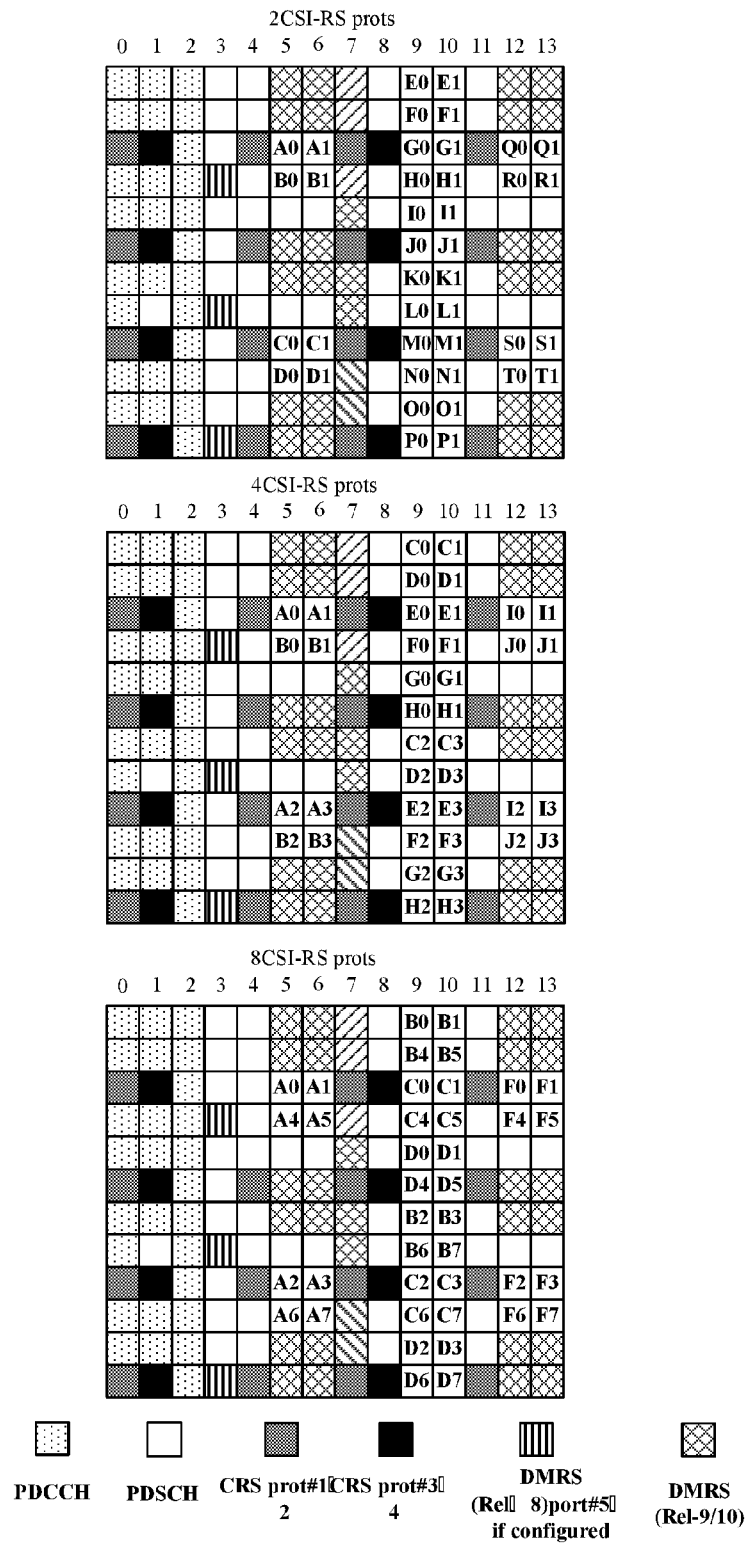
FIG. 4 is a schematic diagram of configuration of CSI-RS's in the prior art.
Figure 5:
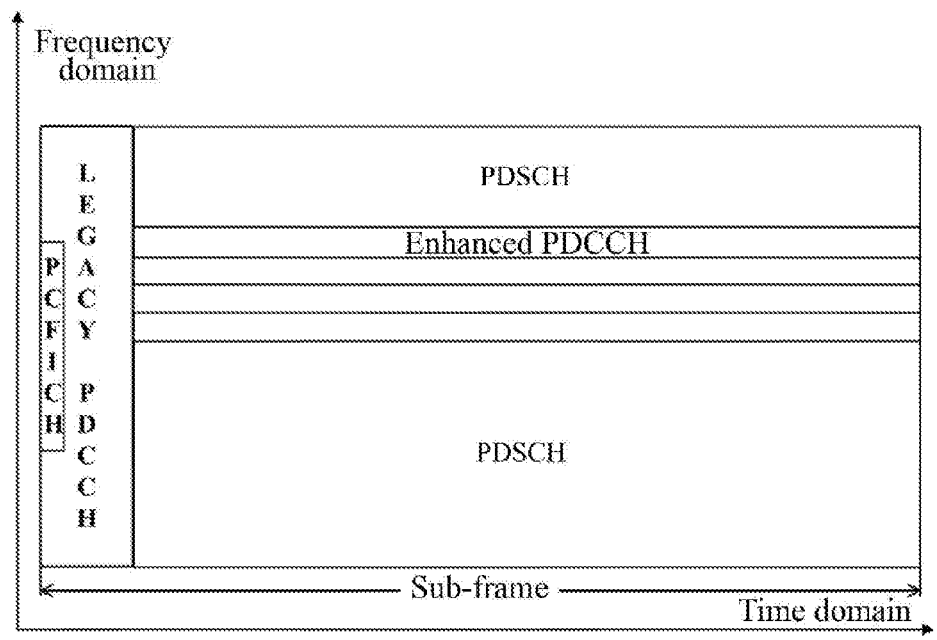
FIG. 5 is a schematic diagram of E-PDCCH transmission in the consecutive frequency domain in the prior art.
Figure 6:
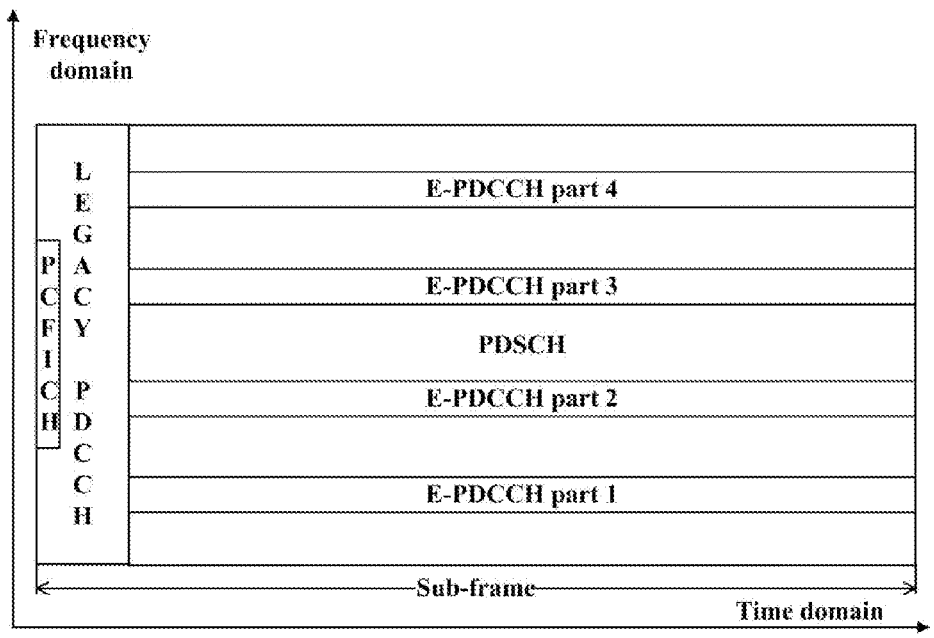
FIG. 6 is a schematic diagram of E-PDCCH transmission in the inconsecutive frequency domain in the prior art.
Figure 7:
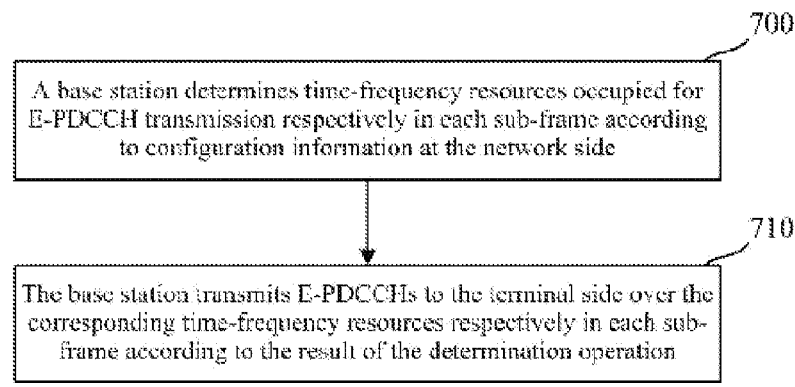
FIG. 7 is a flow chart of transmitting E-PDCCHs by a base station according to an embodiment of the invention.

Referring to FIG. 7, a general flow of transmitting E-PDCCHs at the base station side according to an embodiment of the invention is as follows:

Operation 700: A base station determines time-frequency resources occupied for E-PDCCH transmission respectively in each sub-frame according to configuration information at the network side.

In the embodiment of the invention, the operation 700 can be performed in one of the following two schemes or the combination thereof (by way of an example without any limitation thereto):

In a first scheme (hereinafter referred to as scheme A), the base station determines the number of E-REGs included in a resource granularity (e.g., an E-CCE) at a single aggregation level respectively in each sub-frame according to the configuration information preset at the network side.

With the scheme A, the specific number of E-CCEs are set in each sub-frame, and the base station can determine the number of E-REGs included in an E-CCE at a single aggregation level in each sub-frame according to the configuration information preset at the network side, so that the numbers of REs used to bear E-PDCCH transmission respectively in the respective sub-frames are approximate so as to ensure the consistency of the E-PDCCH transmission performance of the respective sub-frames.

In a second scheme (hereinafter referred to as scheme B), the base station determines a set of aggregation levels and the lowest aggregation level corresponding to each sub-frame respectively under a preset rule according to configuration information preset at the network side.

With the scheme B, specific numbers of E-CCEs and of E-REGs are set in each sub-frame, and the base station can set the set of aggregation levels corresponding to each sub-frame respectively according to the configuration information preset at the network side, so that when E-PDCCHs are transmitted by using the corresponding set of aggregation levels respectively in each sub-frame, the numbers of REs used to bear E-PDCCH transmission respectively in the respective sub-frames are approximate so as to ensure the consistency of the E-PDCCH transmission performance of the respective sub-frames.

These two schemes will be described below in details respectively in the following embodiments.

Operation 710: The base station transmits E-PDCCHs to the terminal side over the corresponding time-frequency resources respectively in each sub-frame according to the result of the determination operation.

Details are as follows:

If the base station configures the respective sub-frames in the scheme A, then the base station transmits E-PDCCHs via the corresponding number of E-REGs included in an E-CCE at a single aggregation level respectively in each sub-frame.

If the base station configures the respective sub-frames in the scheme B, then the base station transmits E-PDCCHs at the corresponding set of aggregation levels respectively in each sub-frame.

Of course, both the scheme A and the scheme B can be used concurrently, that is, the base station sets both the number of E-REGs included in an E-CCE at a single aggregation level in each sub-frame and the set of aggregation levels and the lowest aggregation level corresponding to each sub-frame respectively so that the numbers of REs to transmit E-PDCCHs respectively in the respective sub-frames can be controlled more precisely.

Based upon the embodiments described above, particular implementations of the scheme A and the scheme B will be described below in details.

Scheme A:

The base station can determine the number of E-REGs included in an E-CCE at a single aggregation level respectively in each sub-frame under the preset rule according to the configuration information preset at the network side, particularly as follows (taking any sub-frame as an example):

Firstly the base station determines the number, denoted as N, of REs to transmit E-PDCCHs in one PRB pair in the any sub-frame according to the configuration information preset at the network side, where, N does not include the number of REs to transmit reference signals (e.g., a legacy PDCCH region, a CRS, a DMRS, a CSI-RS/Zero Power CSI-RS).

Secondly the base station determines the number, denoted as R, of REs to transmit E-PDCCHs in an E-REG in the any sub-frame based on N.

Particularly the number of REs to transmit E-PDCCHs in one sub-frame is calculated in the equation of $R=\lfloor N/K \rfloor$, where K represents the preset specific number of E-REGs included in one PRB pair.

Finally the base station compares R with a preset threshold and determines the number of E-REGs included in an E-CCE at a single aggregation level in the any sub-frame according to the result of the comparison operation.

Particularly if R is less than or equal to the preset threshold, then one E-CCE is set to include two E-REGs (or more than two E-REGs dependent upon a particular condition); and if R is greater than the preset threshold, then one E-CCE is set to include one E-REG. Thus the E-PDCCH transmission performance of the respective sub-frames can be balanced well.

For example, if reference signals of the system are transmitted in more REs in the sub-frame 1, then there will be less available REs in which E-PDCCHs are transmitted, for example, 15 REs are included in one E-REG; and on the contrary, if reference signals of the system are transmitted in less REs in the sub-frame 2, then there will be more available REs in which E-PDCCHs are transmitted, for example, 30 REs are included in one E-REG. Thus it is assumed that the two sub-frames described above are configured with one same specific E-CCE to transmit E-PDCCHs, then one E-CCE in the sub-frame 1 is set to include two E-REGs, so the total number of REs to transmit E-PDCCHs in the sub-frame 1 is 30; and alike one E-CCE in the sub-frame 2 is set to include one E-REG, so the total number of REs to transmit E-PDCCHs in the sub-frame 2 is also 30. Apparently the E-PDCCH transmission performance of the sub-frame 1 and the sub-frame 2 can be balanced to some extent.

With this method, the number of E-REGs included in a resource granularity (i.e., an E-CCE) at a single aggregation level is variable. In this method, the set of aggregation levels {1,2,4,8} defined for legacy PDCCHs will be not modified, but instead the number of E-REGs included in the E-CCE can be adjusted, so that there will be substantially the approximate numbers of REs across the respective sub-frames at the same aggregation level despite a variety of system configurations and thus the E-PDCCH transmission performance at the same aggregation level will be equivalent substantially.

On the other hand, after the operation 700 and before the operation 710, the base station indicates the numbers of E-REGs included in the E-CCE at the single aggregation level corresponding to the respective sub-frames directly to the terminal via higher-layer signaling, or can alternatively notify the terminal of the configuration information preset at the network side, so that the terminal determines the number of E-REGs included in an E-CCE at a single aggregation level respectively in each sub-frame under the same preset rule.

Scheme B:

The base station can determine the set of aggregation levels and the lowest aggregation level corresponding to each sub-frame respectively under the preset rule according to the configuration information preset at the network side, particularly as follows (taking any sub-frame as an example):

Firstly the base station determines the number, denoted as N, of REs to transmit E-PDCCHs in one PRB pair in the any sub-frame according to the configuration information preset at the network side, where, N does not include the number of REs to transmit reference signals (e.g., a legacy PDCCH region, a CRS, a DMRS, a CSI-RS/Zero Power CSI-RS).

Secondly the base station determines the number, denoted as R, of REs to transmit E-PDCCHs in an E-REG in the any sub-frame based on N.

Particularly the number of REs to transmit E-PDCCHs in one sub-frame is calculated in the equation of $R=\lfloor N/K \rfloor$, where K represents the preset specific number of REGs included in one PRB pair.

Finally the base station compares R with a preset threshold and determines the set of aggregation levels and the lowest aggregation level corresponding to the any sub-frame according to the result of the comparison operation.

Particularly if R is less than or equal to the preset threshold, then the set of aggregation levels and the lowest aggregation level corresponding to the any sub-frame are {2,4,8,16} and 2 respectively; and if R is greater than the preset threshold, then the set of aggregation levels and the lowest aggregation level corresponding to the any sub-frame are {1,2,4,8} and 1 respectively. Thus the E-PDCCH transmission performance of the respective sub-frames can be balanced well.

For example, if each sub-frame is provided with one specific E-CCE respectively, and one specific E-REG is included in one E-CCE, then it is assumed that 15 REs are included in one E-REG in the sub-frame 1 and 30 REs are included in one E-REG in the sub-frame 2, so that the set of aggregation levels and the lowest aggregation level corresponding to the sub-frame 1 are set to {2,4,8,16} and 2 respectively, and thus the set of the numbers of REs to transmit E-PDCCHs in the sub-frame 1 is {30,60,120,240}; and alike the set of aggregation levels and the lowest aggregation level corresponding to the sub-frame 2 are set to {1,2,4,8} and 1 respectively, and thus the set of the numbers of REs to transmit E-PDCCHs in the sub-frame 2 is {30, 60,120,240}. Apparently the E-PDCCH transmission performance of the sub-frame 1 and the sub-frame 2 can be balanced to some extent.

Figure 8:
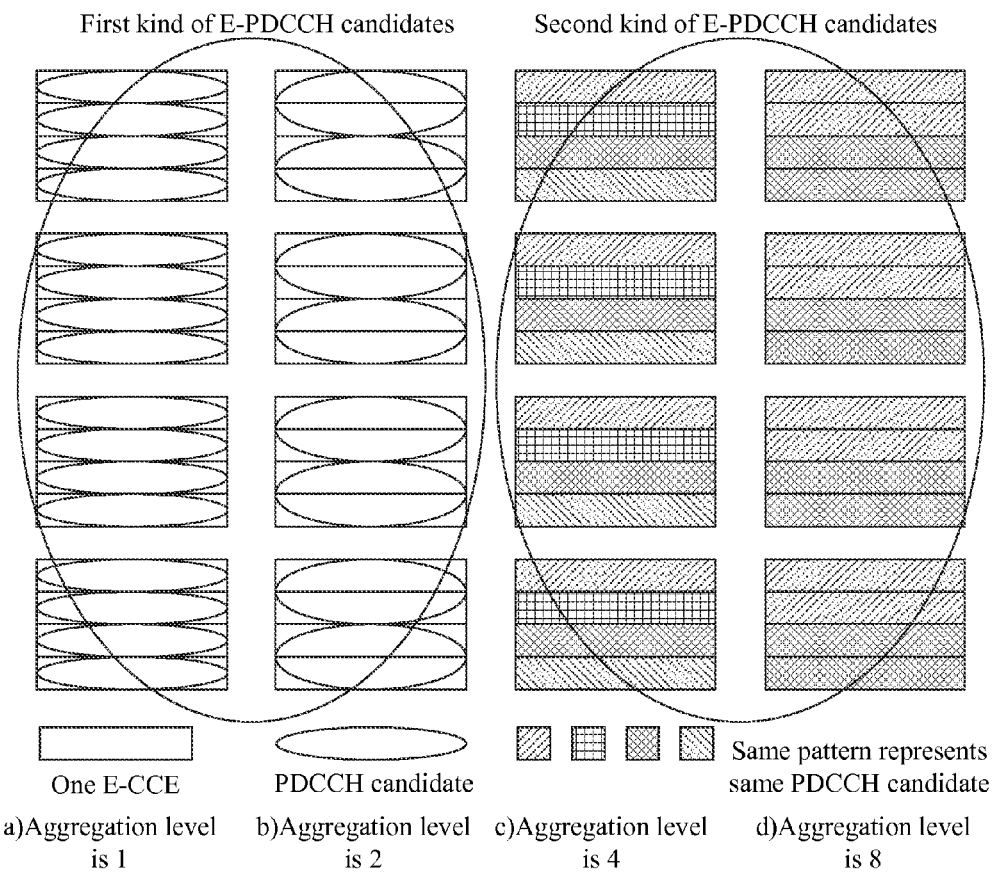
FIG. 8 is a schematic diagram of allocating candidate E-PDCCHs according to an embodiment of the invention.

With this method, the number of E-REGs included in a resource granularity (an E-CCE) at a single aggregation level is invariable, where the specific number of E-REGs included in the E-CCE is L. For example, the original set of aggregation levels {1,2,4,8} defined for legacy PDCCHs continues being used when the overhead of reference signals of the system configured currently in the sub-frame is comparatively low; and the set of aggregation levels is set as {2,4,8,16} when the overhead of reference signals of the system configured currently in the sub-frame is comparatively high. Equivalently candidate E-PDCCHs are configured for the different aggregation levels, where the number of candidate E-PDCCHs configured at the aggregation level 1 is typically 0 and candidate E-PDCCHs are added at the aggregation level 16. Reference can be made to FIG. 8 for details about allocation of candidate E-PDCCHs. Thus there will be substantially the approximate numbers of REs across the respective sub-frames at the same aggregation level despite a variety of system configurations and thus the E-PDCCH transmission performance at the e same aggregation level will be equivalent substantially.

On the other hand after the operation 700 and before the operation 710, the base station notifies the terminal of the sets of aggregation levels and the lowest aggregation levels corresponding to the respective sub-frames via higher-layer signaling, or notifies the terminal of the configuration information preset at the network side via higher-layer signaling so that the terminal determines the sets of aggregation levels and the lowest aggregation levels corresponding to the respective sub-frames under the same preset rule as the network side, where the base station can adopt the following three particular notification schemes without any limitation thereto for the first scenario:

1. The base station notifies the terminal of the lowest aggregation level so that the terminal determines the corresponding set of aggregation levels according to the obtained lowest aggregation level, for example, the terminal is notified of the lowest aggregation level 1 so that the terminal itself derives that the set of aggregation levels is {1,2,4,8}.

2. The base station notifies the terminal of the set of aggregation levels so that the terminal determines the corresponding lowest aggregation level according to the obtained set of aggregation levels, for example, the terminal is notified of the set of aggregation levels {1,2,4,8} so that the terminal itself derives that the lowest aggregation level is 1.

3. The base station notifies the terminal of the set of candidate E-PDCCH channels so that the terminal derives the set of aggregation levels and the lowest aggregation level from the set of candidate E-PDCCH channels.

For example, typically the base station configures the terminal with the corresponding set of candidate E-PDCCH channels {6,6,2,2} for blind detection in the set of aggregation levels {1,2,4,8}, and as can be apparent, the lowest aggregation level thereof is 1; and the base station configures the terminal with the corresponding set of candidate E-PDCCH channels {0,6,6,2,2} for blind detection in the set of aggregation levels {1,2,4,8,16}, and as can be apparent, the lowest aggregation level thereof for blind detection is 2, and the actual set of aggregation levels for blind detection is {2,4,8,16}. Thus, if the set of candidate E-PDCCH channels, of which the base station notifies the terminal, is {6,6,2,2}, then the terminal determines that the corresponding set of aggregation levels and lowest aggregation level are {1,2,4,8} and 1 respectively; and if the set of candidate E-PDCCH channels, of which the base station notifies the terminal, is {0,6,6,2,2}, then the terminal determines that the corresponding set of aggregation levels and lowest aggregation level are {2,4,8,16} and 2 respectively.

On the other hand, in an embodiment of the invention, if the base station adopts both the scheme A and the scheme B, then the base station can alternatively notify the terminal of the number of E-REGs included in an E-CCE at a single aggregation level in each sub-frame via higher-layer signaling and notify the terminal side of the configuration information preset at the network side via higher-layer signaling so that the terminal side determines the set of aggregation levels and the lowest aggregation level corresponding to each sub-frame respectively under the same preset rule as the network side.

Figure 9:
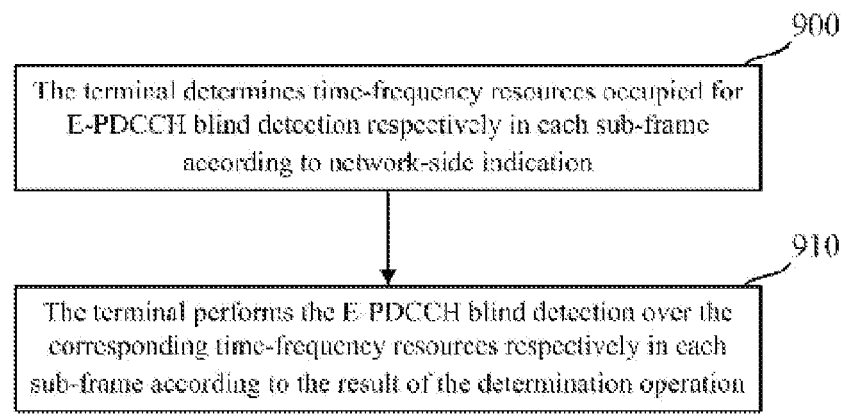
FIG. 9 is a flow chart of performing E-PDCCH blind detection by a terminal according to an embodiment of the invention.

In correspondence to the embodiments described above, referring to FIG. 9, a general flow of performing E-PDCCH blind detection by a terminal over time-frequency resources indicated by a base station according to an embodiment of the invention is as follows:

Operation 900: The terminal determines time-frequency resources occupied for E-PDCCH blind detection respectively in each sub-frame according to network-side indication.

In an embodiment of the invention, the terminal can perform the operation 900 in one of the following two schemes or the combination thereof (by way of an example without any limitation thereto):

In a scheme C, the terminal determines the number of E-REGs included in a resource granularity at a single aggregation level respectively in each sub-frame according to high-layer signaling transmitted from the network side or under the same preset rule as the network side based upon obtained configuration information preset at the network side.

In this case, when determining the number of E-REGs included in a resource granularity at a single aggregation level in any sub-frame under the same preset rule as the network side based upon the obtained configuration information preset at the network side, the terminal can determine the number of REs to transmit reference signals in the any sub-frame according to the configuration information preset at the network side, determine the number of REs in one E-REG to transmit E-PDCCHs in the any sub-frame based upon the number of REs to transmit reference signals, compare the number of REs to transmit E-PDCCHs with a preset threshold, and determine the number of E-REGs included in the resource granularity at the single aggregation level in the any sub-frame according to the result of the comparison operation.

With this method, the number of E-REGs included in a resource granularity (i.e., an E-CCE) at a single aggregation level is variable. In this method, the set of aggregation levels {1,2,4,8} defined for legacy PDCCHs will be not modified, but instead the number of E-REGs included in the E-CCE can be adjusted, so that there will be substantially the approximate numbers of REs across the respective sub-frames at the same aggregation level despite a variety of system configurations and thus the E-PDCCH transmission performance at the same aggregation level will be equivalent substantially.

In a scheme D, the terminal determines the set of aggregation levels and the lowest aggregation level corresponding to each sub-frame respectively according to high-layer signaling transmitted from the network side or under the same preset rule as the network side based upon obtained configuration information preset at the network side.

In this case, when determining the set of aggregation levels and the lowest aggregation level corresponding to any sub-frame under the same preset rule as the network side based upon the obtained configuration information preset at the network side, the terminal can determine the number of REs to transmit reference signals in the any sub-frame according to the configuration information preset at the network side, determine the number of REs to transmit E-PDCCHs in one E-REG in the any sub-frame based upon the number of REs to transmit reference signals, compare the number of REs to transmit E-PDCCHs with a preset threshold, and determine the set of aggregation levels and the lowest aggregation level corresponding to the any sub-frame according to the result of the comparison operation.

Furthermore the terminal can determine the set of aggregation levels and the lowest aggregation level corresponding to the any sub-frame according to the high-layer signaling transmitted from the network side in the following three schemes without any limitation thereto:

1. The terminal obtains the lowest aggregation level corresponding to the any sub-frame according to the high-layer signaling transmitted from the network side and determines the corresponding set of aggregation levels according to the lowest aggregation level; or 2. The terminal obtains the set of aggregation levels corresponding to the any sub-frame according to the high-layer signaling transmitted from the network side and determines the corresponding lowest aggregation level according to the set of aggregation levels; or 3. The terminal obtains a set of candidate E-PDCCH channels corresponding to the any sub-frame according to the high-layer signaling transmitted from the network side and determines the corresponding set of aggregation levels and lowest aggregation level according to the set of candidate E-PDCCH channels.

With this method, the number of E-REGs included in a resource granularity (an E-CCE) at a single aggregation level is invariable, where the specific number of E-REGs included in the E-CCE is L. Equivalently candidate E-PDCCHs are configured for the different aggregation levels, where the number of candidate E-PDCCHs configured at the aggregation level 1 is typically 0 and candidate E-PDCCHs are added at the aggregation level 16. Reference can be made to FIG. 8 for details about allocation of candidate E-PDCCHs. Thus there will be substantially the approximate numbers of REs across the respective sub-frames at the same aggregation level despite a variety of system configurations and thus the E-PDCCH transmission performance at the same aggregation level will be equivalent substantially.

On the other hand, in an embodiment of the invention, if the base station adopts both the scheme A and the scheme B concurrently, then the terminal can obtain the desirable information by using the scheme C in combination with the scheme D correspondingly, that is, the terminal can obtain the number of E-REGs included in the E-CCE at the single aggregation level in each sub-frame according to the higher-layer signaling transmitted from the network side and determine the set of aggregation levels and the lowest aggregation level corresponding to each sub-frame respectively under the same preset rule as the network side based upon the obtained configuration information preset at the network side.

Operation 910: The terminal performs the E-PDCCH blind detection over the corresponding time-frequency resources respectively in each sub-frame according to the result of the determination operation.

Details are as follows:

If the base station configures the respective sub-frames in the scheme A, then the terminal performs the E-PDCCH blind detection in accordance with the corresponding number of E-REGs included in an E-CCE at the corresponding aggregation level respectively in each sub-frame.

If the base station configures the respective sub-frames in the scheme B, then the terminal performs the E-PDCCH blind detection in accordance with the corresponding set of aggregation levels and lowest aggregation level respectively in each sub-frame.

Of course, both the scheme A and the scheme B can be used concurrently, and then the terminal performs the E-PDCCH blind detection both in accordance with both the number of E-REGs included in an E-CCE at a single aggregation level in each sub-frame and the set of aggregation levels and the lowest aggregation level corresponding to each sub-frame respectively, to thereby obtain the better E-PDCCH performance.

Of course, the respective methods described above can be applicable to a Multimedia Broadcast multicast service Single Frequency Network (MBSFN) sub-frame and a Downlink Pilot Time Slot (DwPTS). For the two scenarios where the DwPTS is configured as 0 and 5 respectively, only three OFDM symbols are occupied for the DwPTS, so under such the DwPTS configuration, if E-PDCCH transmission is supported in the DwPTS, then the base station can further increase the number of E-REGs included in E-CCE at a single aggregation level in the DwPTS or can further increase the aggregation level of the DwPTS; or it can be defined that E-PDCCH transmission is not supported under such the DwPTS configuration.

Particular implementations of the operations 900 to 910 at the terminal are consistent with those at the base station side, and reference can be made to the relevant description of the base station side for details thereof, so a repeated description thereof will be omitted herein.

The embodiments described above will be further described below in several particular application scenarios.

Figure 10:
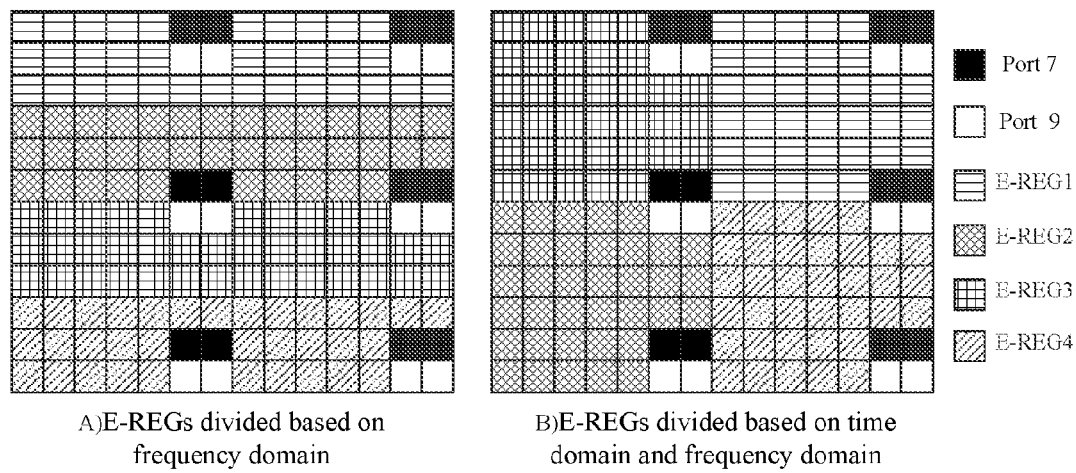
FIG. 10 is a schematic diagram of configuration of E-REGs according to an embodiment of the invention.
Figure 11:
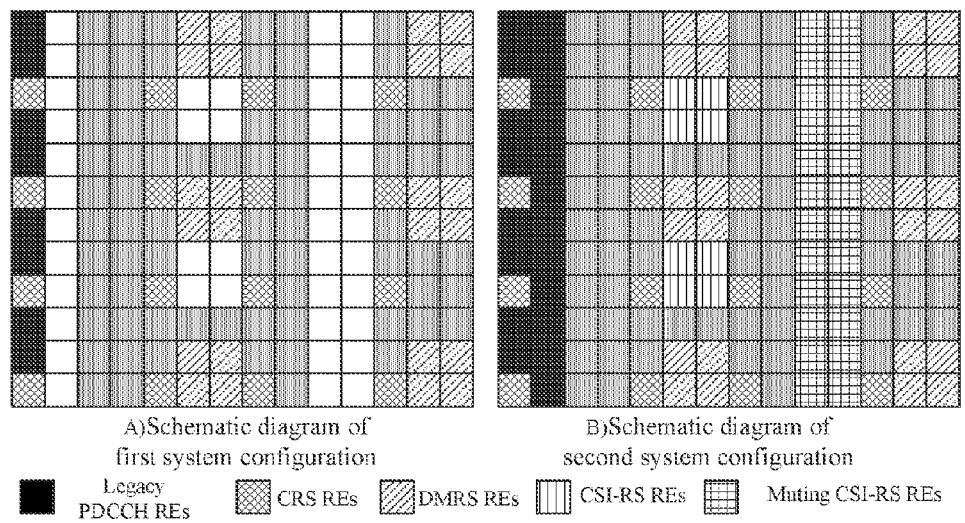
FIG. 11 is a schematic diagram of configuration of REs, which can be used to bear E-PDCCH transmission, in a PRB pair according to an embodiment of the invention.

Referring to FIG. 10, it is assumed that one PRB pair includes four E-REGs with non-overlapping resources, and referring to FIG. 11, it is assumed that there are two system configurations as follows:

First System Configuration:

With the type of a normal CP, there are two CRS ports (16 REs) and four DMRS ports (24 REs), one OFDM symbol is occupied by the legacy PDCCH control region (eight REs are occupied while a CRS is precluded), and no CSI-RS/Zero Power CSI-RS port is configured, so the number of REs available in one PRB pair is 168−(16+24+8)=120, and thus each E-REG has approximately 120/4=30 REs, as illustrated in sub-figure A of FIG. 11.

Second System Configuration:

With the type of a normal CP, there are two CRS ports (16 REs) and four DMRS ports (24 REs), two OFDM symbols are occupied by the legacy PDCCH control region (20 REs are occupied while a CRS is precluded), and there are 8-port CSI-RS's (eight REs) and all the possible Zero Power CSI-RS ports (24 REs), so the number of REs available in one PRB pair is 168−(16+24+20)−(8+24)=76, and thus each E-REG has approximately 76/4=19 REs, particularly as illustrated in sub-figure B of FIG. 11.

In a first application scenario, if the first system configuration described above is adopted, then the number of E-REGs included in one E-CCE may be 1; and if the second system configuration described above is adopted, then the number of E-REGs included in one E-CCE may be 2.

In a second application scenario, one E-CCE is composed of one E-REG described above, so if the first system configuration described above is adopted, then the size of one E-CCE is approximately 30 REs, and the set of aggregation levels configured for E-PDCCH blind detection can be the same as that of the legacy PDCCH, i.e., {1,2,4,8} with the lowest aggregation level 1; and if the second system configuration described above is adopted, then the size of one E-CCE is approximately 19 REs, the lowest aggregation level configured for E-PDCCH blind detection is 2, and the corresponding set of aggregation levels can be {2,4,8,16}.

Alternatively in the second application scenario described above, the base station can indicate the set of aggregation levels and the lowest aggregation level for E-PDCCH blind detection by configuring a set of candidate E-PDCCHs at each aggregation level. For example, one E-CCE is composed of one E-REG described above, so if the first system configuration described above is adopted, then the base station configures the terminal with the set of candidate E-PDCCHs {6,6,2,2} for blind detection in the case of the set of aggregation levels {1,2,4,8}, where the lowest aggregation level thereof for blind detection is 1, so the real set of aggregation levels of the terminal for E-PDCCH blind detection is {1,2,4,8}; and if the second system configuration described above is adopted, and the size of one E-CCE is approximately 19 REs, then the base station configures the terminal with the set of candidate E-PDCCHs {0,8,4,4} for blind detection in the case of the set of aggregation levels {1,2,4,8}, and as can be apparent, the real lowest aggregation level thereof for blind detection is 2 and the real set of aggregation levels thereof for blind detection is {2,4,8}; or the base station can configure the terminal with the set of candidate E-PDCCHs {0,6,6,2,2} for blind detection in the case of the set of aggregation levels {1,2,4,8,16}, and as can be apparent, the real lowest aggregation level thereof for blind detection is 2 and the real set of aggregation levels thereof for blind detection is {2,4,8,16}.

Figure 12:
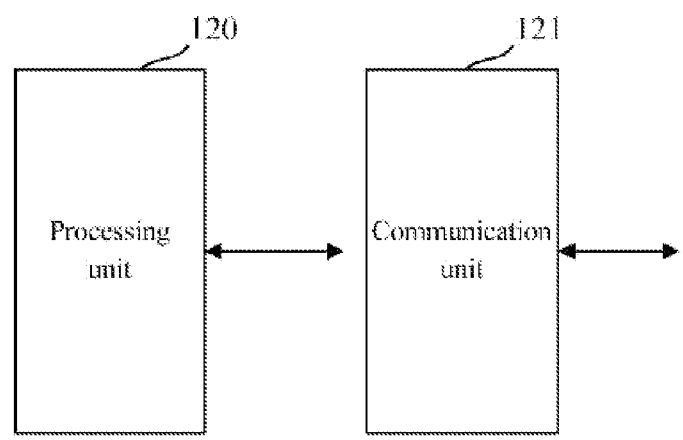
FIG. 12 is a schematic functional structural diagram of a base station according to an embodiment of the invention.
Figure 13:
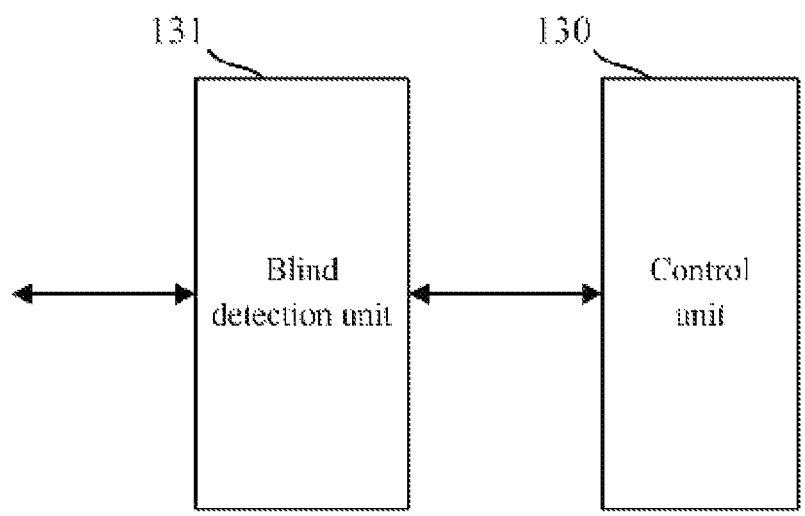
FIG. 13 is a schematic functional structural diagram of a terminal according to an embodiment of the invention.

Based upon the respective embodiments described above, referring to FIG. 12 and FIG. 13, a base station according to an embodiment of the invention includes a processing unit 120 and a communication unit 121, where:

The processing unit 120 is configured to determine time-frequency resources occupied for E-PDCCH transmission respectively in each sub-frame according to configuration information at the network side; and The communication unit 121 is configured to transmit E-PDCCHs to the terminal side over the corresponding time-frequency resources respectively in each sub-frame according to a result of determination.

A terminal includes a control unit 130 and a blind detection unit 131, where:

The control unit 130 is configured to determine time-frequency resources occupied for E-PDCCH blind detection respectively in each sub-frame according to network-side indication; and The blind detection unit 131 is configured to perform the E-PDCCH blind detection over the corresponding time-frequency resources respectively in each sub-frame according to a result of determination.

In summary, the embodiments of the invention provide a method of configuring resources for E-PDCCH transmission according to the system configuration, where the network side performs corresponding E-PDCCH transmission resource configuration for each sub-frame, and the terminal respectively adopts different modes to perform E-PDCCH blind detection in each frame, so that better link adaptation of the E-PDCCH transmission can be implemented. Therefore, the balance of E-PDCCH transmission in sub-frames is ensured, the effect of E-PDCCH blind detection of the terminal is further improved, and the E-PDCCH demodulation performance is further promoted.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer usable storage mediums (including but not limited to a disk memory, a CD-ROM, an optical memory, etc.) in which computer usable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for Enhanced-Physical Downlink Control Channel, E-PDCCH, transmission, comprising:
   determining time-frequency resources occupied for E-PDCCH transmission respectively in each sub-frame according to configuration information at a network side; and
   transmitting E-PDCCHs to a terminal side over the corresponding time-frequency resources respectively in each sub-frame according to a result of the determination;
   wherein determining the time-frequency resources occupied for E-PDCCH transmission respectively in each sub-frame according to the configuration information at the network side comprises at least one of:
   determining the number of Enhanced-Resource Element Groups, E-REGs, included in a resource granularity at a single aggregation level respectively in each sub-frame under a preset rule according to the configuration information preset at the network side; and
   determining a set of aggregation levels and a lowest aggregation level corresponding to each sub-frame respectively under a preset rule according to the configuration information preset at the network side.

2. The method according to claim 1, wherein determining the number of E-REGs included in the resource granularity at the single aggregation level in any sub-frame under the preset rule according to the configuration information preset at the network side comprises:
   determining the number of Resource Elements, REs, to transmit reference signals in the any sub-frame according to the configuration information preset at the network side, determining the number of REs to transmit E-PDCCHs in an E-REG in the any sub-frame according to the number of REs to transmit reference signals, comparing the number of REs to transmit E-PDCCHs with a preset threshold, and determining the number of E-REGs included in the resource granularity at the single aggregation level in the any sub-frame according to a result of the comparison.

3. The method according to claim 1, wherein determining the set of aggregation levels and the lowest aggregation level corresponding to any sub-frame under the preset rule according to the configuration information preset at the network side comprises:
   determining the number of Resource Elements, REs, to transmit reference signals in the any sub-frame according to the configuration information preset at the network side, determining the number of REs to transmit E-PDCCHs in an E-REG in the any sub-frame according to the number of REs to transmit reference signals, comparing the number of REs to transmit E-PDCCHs with a preset threshold, and determining the set of aggregation levels and the lowest aggregation level corresponding to the any sub-frame according to a result of the comparison.

4. The method according to claim 1, wherein after determining the number of E-REGs included in the resource granularity at the single aggregation level respectively in each sub-frame under the preset rule according to the configuration information preset at the network side, and before transmitting the E-PDCCHs, the method further comprises:

notifying the terminal side of the number of E-REGs included in the resource granularity at the single aggregation level in each sub-frame by using higher-layer signaling, or notifying the terminal side of the configuration information preset at the network side, then the terminal side determines the number of E-REGs included in the resource granularity at the single aggregation level respectively in each sub-frame under the same preset rule as the network side;

after determining the set of aggregation levels and the lowest aggregation level corresponding to each sub-frame respectively under the preset rule according to the configuration information preset at the network side, and before transmitting the E-PDCCHs, the method further comprises:

indicating the set of aggregation levels and the lowest aggregation level corresponding to each sub-frame to the terminal side by using higher-layer signaling, or notifying the terminal side of the configuration information preset at the network side, then the terminal side determines the set of aggregation levels and the lowest aggregation level corresponding to each sub-frame under the same preset rule as the network side.

5. The method according to claim 4, wherein indicating the set of aggregation levels and the lowest aggregation level corresponding to any sub-frame to the terminal side by using higher-layer signaling comprises:

notifying the terminal side of the lowest aggregation level corresponding to the any sub-frame by using higher-layer signaling, then the terminal side determines the corresponding set of aggregation levels according to the obtained lowest aggregation level; or notifying the terminal side of the set of aggregation levels corresponding to the any sub-frame by using higher-layer signaling so that the terminal side determines the corresponding lowest aggregation level according to the obtained set of aggregation levels; or notifying the terminal side of a set of candidate E-PDCCH channels corresponding to the any sub-frame by using higher-layer signaling, then the terminal side determines the corresponding set of aggregation levels and lowest aggregation level according to the set of candidate E-PDCCH channels.

6. A method for Enhanced-Physical Downlink Control Channel, E-PDCCH, blind detection, comprising:

determining time-frequency resources occupied for E-PDCCH blind detection respectively in each sub-frame according to network-side indication; and performing the E-PDCCH blind detection over the corresponding time-frequency resources respectively in each sub-frame according to a result of determination;

wherein determining the time-frequency resources occupied for the E-PDCCH blind detection respectively in each sub-frame according to the network-side indication comprises at least one of:

determining the number of Enhanced-Resource Element Groups, E-REGs, included in a resource granularity at a single aggregation level respectively in each sub-frame according to high-layer signaling transmitted from a network side or under a same preset rule as the network side based upon obtained configuration information preset at the network side; and determining a set of aggregation levels and a lowest aggregation level corresponding to each sub-frame respectively according to high-layer signaling transmitted from the network side or under the same preset rule as the network side based upon obtained configuration information preset at the network side.

7. The method according to claim 6, wherein determining the set of aggregation levels and the lowest aggregation level corresponding to any sub-frame according to high-layer signaling transmitted from the network side comprises:

obtaining the lowest aggregation level corresponding to the any sub-frame according to the high-layer signaling transmitted from the network side and determining the corresponding set of aggregation levels according to the lowest aggregation level; or obtaining the set of aggregation levels corresponding to the any sub-frame according to the high-layer signaling transmitted from the network side and determining the corresponding lowest aggregation level according to the set of aggregation levels; or obtaining a set of candidate E-PDCCH channels corresponding to the any sub-frame according to the high-layer signaling transmitted from the network side and determining the corresponding set of aggregation levels and lowest aggregation level according to the set of candidate E-PDCCH channels.

8. The method according to claim 6, wherein determining the number of E-REGs included in the resource granularity at the single aggregation level in any sub-frame under the same preset rule as the network side based upon the obtained configuration information preset at the network side comprises:

determining the number of Resource Elements, REs, to transmit reference signals in the any sub-frame according to the configuration information preset at the network side, determining the number of REs to transmit E-PDCCHs in an E-REG in the any sub-frame according to the number of REs to transmit reference signals, comparing the number of REs to transmit E-PDCCHs with a preset threshold, and determining the number of E-REGs included in the resource granularity at the single aggregation level in the any sub-frame according to a result of the comparison.

9. The method according to claim 6, wherein determining the set of aggregation levels and the lowest aggregation level corresponding to any sub-frame under the same preset rule as the network side based upon the obtained configuration information preset at the network side comprises:

determining the number of Resource Elements, REs, to transmit reference signals in the any sub-frame according to the configuration information preset at the network side, determining the number of REs to transmit E-PDCCHs in an E-REG in the any sub-frame according to the number of REs to transmit reference signals, comparing the number of REs to transmit E-PDCCHs with a preset threshold, and determining the set of aggregation levels and the lowest aggregation level corresponding to the any sub-frame according to a result of the comparison.

10. A device for Enhanced-Physical Downlink Control Channel, E-PDCCH, transmission, comprising:

at least one processor; and a memory communicably connected with the at least one processor for storing instructions executable by the at least one processor, wherein execution of the instructions by the at least one processor causes the at least one processor to:

determine time-frequency resources occupied for E-PD-CCH transmission respectively in each sub-frame according to configuration information at a network side; and transmit E-PDCCHs to a terminal side over the corresponding time-frequency resources respectively in each sub-frame according to a result of the determination;

wherein the execution of the instructions by the at least one processor further causes the at least one processor to determine the time-frequency resources occupied for E-PDCCH transmission respectively in each sub-frame according to the configuration information at the network side by at least one of: determining the time-frequency resources occupied for E-PDCCH transmission respectively in each sub-frame according to the configuration information at the network side by determining the number of Enhanced-Resource Element Groups, E-REGs, included in a resource granularity at a single aggregation level respectively in each sub-frame under a preset rule according to the configuration information preset at the network side; and determining the time-frequency resources occupied for E-PDCCH transmission respectively in each sub-frame according to the configuration information at the network side by determining a set of aggregation levels and a lowest aggregation level corresponding to each sub-frame respectively under a preset rule according to the configuration information preset at the network side.

11. The device according to claim 10, wherein the execution of the instructions by the at least one processor further causes the at least one processor to: determine the number of E-REGs included in the resource granularity at the single aggregation level in any sub-frame under the preset rule according to the configuration information preset at the network side by determining the number of Resource Elements, REs, to transmit reference signals in the any sub-frame according to the configuration information preset at the network side, determining the number of REs to transmit E-PDCCHs in an E-REG in the any sub-frame according to the number of REs to transmit reference signals, comparing the number of REs to transmit E-PDCCHs with a preset threshold, and determining the number of E-REGs included in the resource granularity at the single aggregation level in the any sub-frame according to a result of the comparison.

12. The device according to claim 10, wherein the execution of the instructions by the at least one processor further causes the at least one processor to: determine the set of aggregation levels and the lowest aggregation level corresponding to any sub-frame under the preset rule according to the configuration information preset at the network side by determining the number of Resource Elements, REs, to transmit reference signals in the any sub-frame according to the configuration information preset at the network side, determining the number of REs to transmit E-PDCCHs in an E-REG in the any sub-frame according to the number of REs to transmit reference signals, comparing the number of REs to transmit E-PDCCHs with a preset threshold, and determining the set of aggregation levels and the lowest aggregation level corresponding to the any sub-frame according to a result of comparison.

13. The device according to claim 10, wherein after determining the number of E-REGs included in the resource granularity at the single aggregation level respectively in each sub-frame under the preset rule according to the configuration information preset at the network side, and before transmitting the E-PDCCHs, the execution of the instructions by the at least one processor further causes the at least one processor to: notify the terminal side of the number of E-REGs included in the resource granularity at the single aggregation level in each sub-frame by using higher-layer signaling, or notify the terminal side of the configuration information preset at the network side, then the terminal side determines the number of E-REGs included in the resource granularity at the single aggregation level respectively in each sub-frame under the same preset rule as the network side;

after determining the set of aggregation levels and the lowest aggregation level corresponding to each sub-frame respectively under the preset rule according to the configuration information preset at the network side, and before transmitting the E-PDCCHs, the execution of the instructions by the at least one processor further causes the at least one processor to: indicate the set of aggregation levels and the lowest aggregation level corresponding to each sub-frame to the terminal side by using higher-layer signaling, or notify the terminal side of the configuration information preset at the network side, then the terminal side determines the set of aggregation levels and the lowest aggregation level corresponding to each sub-frame under the same preset rule as the network side.

14. A device for Enhanced-Physical Downlink Control Channel, E-PDCCH, blind detection, comprising:

at least one processor; and a memory communicably connected with the at least one processor for storing instructions executable by the at least one processor, wherein execution of the instructions by the at least one processor causes the at least one processor to:

determine time-frequency resources occupied for E-PDCCH blind detection respectively in each sub-frame according to network-side indication; and perform the E-PDCCH blind detection over the corresponding time-frequency resources respectively in each sub-frame according to a result of determination;

wherein the execution of the instructions by the at least one processor further causes the at least one processor to determine the time-frequency resources occupied for the E-PDCCH blind detection respectively in each sub-frame according to the network-side indication by at least one of:

determining the number of Enhanced-Resource Element Groups, E-REGs, included in a resource granularity at a single aggregation level respectively in each sub-frame according to high-layer signaling transmitted from a network side or under a same preset rule as the network side based upon obtained configuration information preset at the network side; and determining a set of aggregation levels and a lowest aggregation level corresponding to each sub-frame respectively according to high-layer signaling transmitted from the network side or under the same preset rule as the network side based upon obtained configuration information preset at the network side.

15. The device according to claim 14, wherein the execution of the instructions by the at least one processor further causes the at least one processor to determine the number of E-REGs included in the resource granularity at the single aggregation level in any sub-frame under the same preset rule as the network side based upon the obtained configuration information preset at the network side by determining the number of Resource Elements, REs, to transmit reference signals in the any sub-frame according to the configuration information preset at the network side, determining the number of REs to transmit E-PDCCHs in an E-REG in the any sub-frame according to the number of REs to transmit reference signals, comparing the number of REs to transmit E-PDCCHs with a preset threshold, and determining the number of E-REGs included in the resource granularity at the single aggregation level in the any sub-frame according to a result of the comparison.

16. The device according to claim 14, wherein the execution of the instructions by the at least one processor further causes the at least one processor to determine the set of aggregation levels and the lowest aggregation level corresponding to any sub-frame under the same preset rule as the network side based upon the obtained configuration information preset at the network side by determining the number of Resource Elements, REs, to transmit reference signals in the any sub-frame according to the configuration information preset at the network side, determining the number of REs to transmit E-PDCCHs in an E-REG in the any sub-frame according to the number of REs to transmit reference signals, comparing the number of REs to transmit E-PDCCHs with a preset threshold, and determining the set of aggregation levels and the lowest aggregation level corresponding to the any sub-frame according to a result of the comparison.

* * * * *